United States Patent
Apostoleris et al.

[11] 3,880,978
[45] Apr. 29, 1975

[54] METHOD FOR FORMING A REMOTE ANNULAR RIM OF PLASTIC MATERIAL

[75] Inventors: Theodore G. Apostoleris, Ann Arbor, Mich.; Marion L. Callahan, Cleveland, Ohio

[73] Assignee: Ford Motor Company, Dearborn, Mich. ; by said Apostoleris

[22] Filed: Apr. 23, 1974

[21] Appl. No.: 463,343

[52] U.S. Cl.................................. 264/328; 264/329
[51] Int. Cl............................................... B29f 1/022
[58] Field of Search............................ 264/328, 329

[56] References Cited
UNITED STATES PATENTS

| | | | |
|---|---|---|---|
| 3,132,196 | 5/1964 | Veatch............................ | 264/328 X |
| 3,389,749 | 6/1968 | Towns............................. | 264/328 X |
| 3,626,051 | 12/1971 | Liataud........................... | 264/328 X |
| 3,750,450 | 8/1973 | Sharp.............................. | 264/322 X |

*Primary Examiner*—Richard R. Kucia
*Attorney, Agent, or Firm*—Robert A. Benziger; Keith L. Zerschling

[57] ABSTRACT

A method is disclosed for forming a remote mounting web and rim of plastic material to provide that rim with good structural stength and reliable integrity. The method is intended for use with injection molding plastic forming equipment and is compatible with transfer molding techniques. The remote rim is formed of plastic material which is required to flow under heat and pressure from a central location through web portions to form an annular exterior rim portion which must be continuous and free from defects. In order to assure that the rim portion has the desired integrity and freedom from defects, the mold is provided with means defining high resistance flow paths and low resistance flow paths such that a staggered and overlapping flow pattern is provided for the plastic material. This prevents knit lines from forming across the rim which would constitute a defect or in an extreme case would provide a discontinuity in the annular rim portion. The high resistance flow paths comprise sharp angular changes in flow direction coupled with a relatively thin cross sectional flow area while the low resistance flow paths comprise a gradual angular change in flow direction provided by a relatively large radius of curvature combined with a relatively thicker cross sectional flow area. At the annular rim portion, a relatively short high resistance flow path is arranged in radial proximity to a relatively long low resistance flow path and to be circumferentially adjacent to a second relatively long low resistance flow path.

10 Claims, 5 Drawing Figures

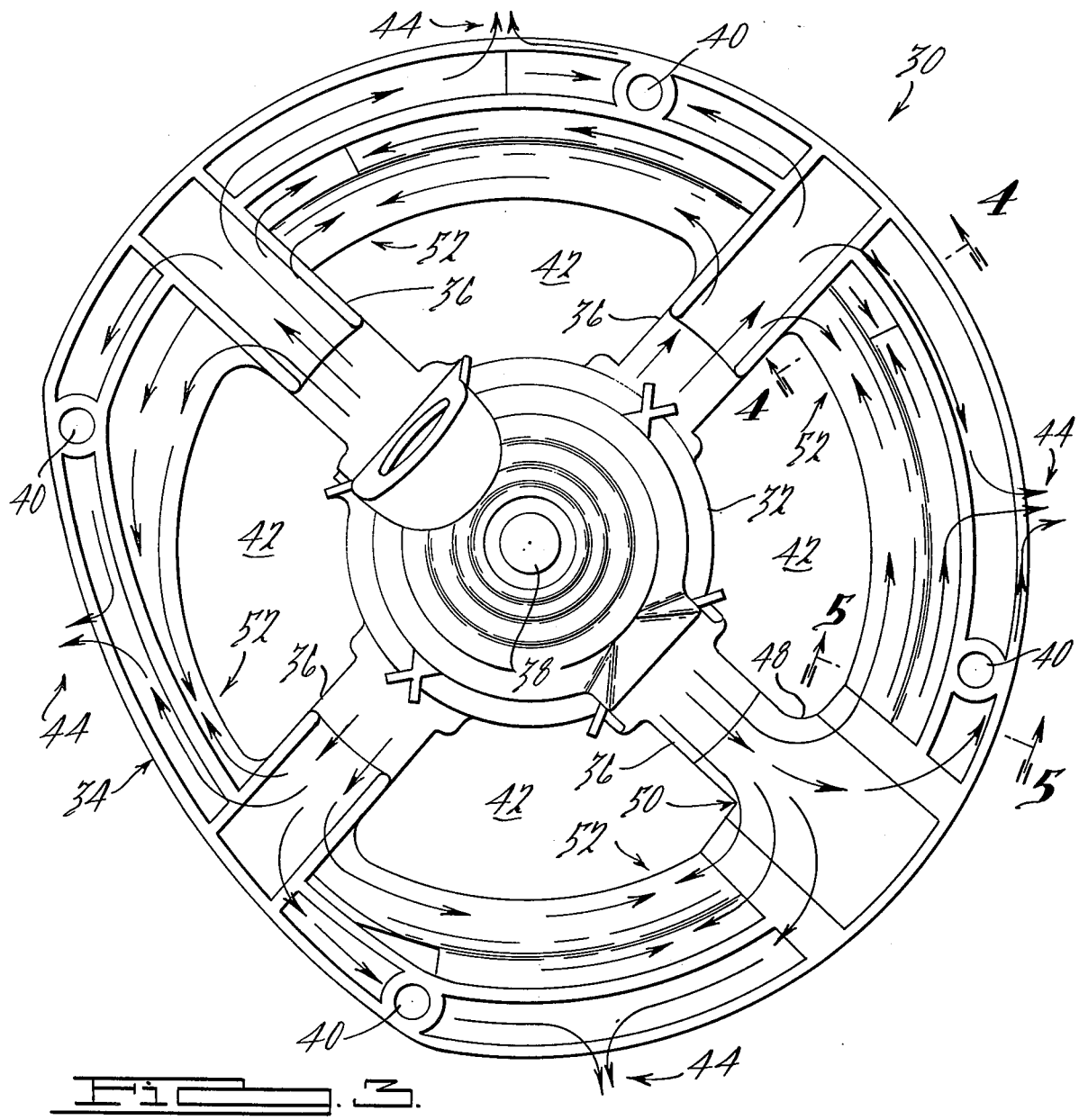
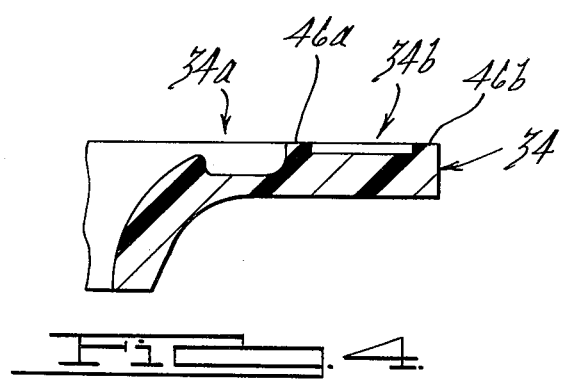
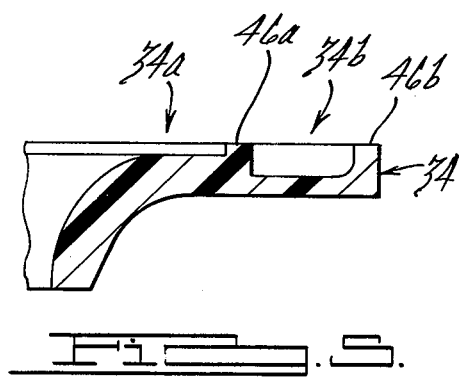

METHOD FOR FORMING A REMOTE ANNULAR RIM OF PLASTIC MATERIAL

BACKGROUND OF THE INVENTION

1. Field of the Invention

The present invention is directed to the field of molding of plastic structures having an annular rim portion which is used for mounting. More particularly, the present invention is directed to that portion of the above-noted field which is concerned with providing injection or transfer molding of glass fiber filled plastic material wherein the plastic material is required to fill an annular mounting rim by flow through a relatively long and circuitous flow route. More particularly still, the present invention is directed to that portion of the above-noted field which is primarily concerned with providing a method of injection or transfer molding of glass fiber filled plastic material to form a remote annular mounting rim having good integrity and freedom from discontinuities or defects which would result in breakage of the plastic annular rim.

2. Description of the Prior Art

Recently issued U.S. Pat. No. 3,766,418, "Permanent Magnet Dynamoelectric Machine Flux Path Assembly," describes a dynamoelectric machine having a central cup-shaped hub portion with a generally radially directed mounting flange. As described in the above-noted patent, the mounting flange is substantially continuous and comprises a portion of a wall of, for example, an air duct. Such housings are normally formed of a relatively high strength plastic material such as a glass fiber filled thermoplastic and find utility as the prime mover for an air moving fan system. The particular housing illustrated in the above-noted United States Letters Patent is for a dynamoelectric machine configuration wherein air movement is generally at right angles to the axis of rotation of the dynamoelectric machine armature.

Other dynamoelectric machines used as fans require that the air flow be generally parallel to the axis of rotation of the dynamoelectric machine armature. For such a machine it is required that the mounting flange be perforated to provide for passage of the air flow. The ideal configuration for such a machine is to provide for a generally annular mounting rim connected to the central hub portion by a web having a plurality of spokes or ribs such that the area between adjacent spokes or ribs and radially inwardly from the annular rim is devoid of plastic material to thereby comprise air flow passages. The annular rim may thereafter be mounted by conventional means to a suitable air duct housing.

Since the centrally mounted dynamoelectric machine armatures normally rotate at a variety of speeds and are not continuously operating so that the housing annular rim and generally radially directed ribs or spokes are subjected to varying degrees of torque, the need for strength in the mounting rim of an axial air flow fan is apparent. The use of plastic material is desirable in forming such housings due to its relatively low cost and ease of formation into a large variety of relatively complex shapes and configurations. However, the use of transfer or injection molding techniques to generate the housing structures has resulted in a problem which it is the specific object of the present invention to solve.

This problem resides in the fact that the above-noted molding techniques require that gas vents be provided in the mold so that the flow of plastic material to all portions of the mold is not impeded by residual air bubbles. The transfer and injection molding techniques normally rely upon the appearance of plastic material at these remote vents to indicate that the plastic material has completely filled the mold. These vents or ports are provided in the mold at equal flow distances from the source of plastic material. In some cases, the vents are clearly defined ports while in other cases the two halves of the mold are arranged to have a small gap formed between them during molding.

In forming a plastic dynamoelectric machine housing as briefly described hereinabove, it is normal to use a glass fiber filled plastic material to provide for good strength of the plastic material throughout the life of the dynamoelectric machine. However, as a result of the presence of the gas vents and the resultant flow of plastic material to indicate that the mold is complete, it has been observed that the abutment of convergent plastic material flows and subsequent aligned flow from the gas vents sometimes results in a structural defect in the parts so formed. This defect results from the fact that the plastic material, in abutting and flowing from the vent or port of the mold, tends to align the fibers of glass fiber filling material, eliminating a desired overlapping of randomly oriented fibers and producing a relatively weakened seam or knit line at the annular rim.

OBJECTS of THE INVENTION

It is therefore a specific object of this invention to provide a method of injection or transfer molding of glass fiber filled plastic material which does not result in an alignment of glass fibers at the gas vents or ports of the mold. It is also a specific object of the present invention to provide a method of injection or transfer molding of a glass fiber filled plastic material which prevents the formation of continuous knit lines across a remote annular rim. More specifically it is an object of this invention to provide such a molding technique which causes any knit lines to be discontinuous. It is a further object of the present invention to provide such a molding technique which causes adjacent sets of discontinuous knit lines to be maximally laterally displaced from each other.

A solution to this problem would be to add a separately formed stiffening member to the mounting rim. The mounting rim could be separately molded. Additional plastic material could also be added to the rim to increase its thickness. Alternatively, the molding process could utilize a plurality of injection points or changes of moldable material. These solutions result in substantial increases in the cost of the molded item, either from substantially increased material content or from increased molding complexity or both. It is therefore a further object of the present invention to provide a molding technique for forming a remote mounting rim and connecting web, the rim and web having reliable integrity and being reliably free from defects anad discontinuities, and which technique does not require substantial increases in the plastic material consumed, does not require the addition of preformed stiffeners or separately formed rim members and does not require multiple molding steps.

One solution to this problem which was attempted with very limited success was the provision of a plurality of circumferentially extending thickened rib portions at several locations on the annular rim. While this provides an increase in the plastic material particularly in the region of the gas vent, it nevertheless results in the above-noted abutment and generally radial alignment of the glass fibers in the vicinity of the gas vent. This solution to the problem is of greater success in the transfer molding technique than it is in the injection molding technique primarily because the transfer molding technique has a longer cycle time and parts so formed are allowed to cure more slowly. This allows greater intertwining of the glass fibers.

SUMMARY OF THE PRESENT INVENTION

The present invention provides a method of molding for use in injection or transfer molding of glass fiber filled plastic material to form a housing member having an annular mounting rim connected to a central portion by a web comprised of a plurality of generally radially extending rib or spoke members wherein a plurality of plastic flow channels are provided by varying the resistance to flow at selected locations in the mold. The annular rim portion of the mold is separated into radially inner and radially outer rim segments and each rim segment is filled through a high resistance flow path and a low resistance flow path. The flow paths are staggered so that a high resistance flow path is radially and circumferentially adjacent to a low resistance flow path. The lengths of the flow paths are arranged to differ such that the inner and outer junctions of plastic flows from two adjacent rib or spoke members are circumferentially staggered or displaced between adjacent flow channels.

In order to provide the desired high and low resistance to flow channels, flow is encouraged by providing relatively large radii of curvature in the low resistance flow channel when the channel changes direction and flow is impeded by providing relatively sharp radii of curvature in the high resistance to flow channel when the channel changes direction. The relatively low resistance to flow channel is provided with a larger flow cross section than is provided in the relatively high resistance to flow channel.

Plastic flow entering a circumferentially inner flow channel is encouraged to be to one side of the spoke member by providing that side with the relatively larger radius of curvature and the relatively thicker cross section. This makes it more difficult to fill the radially inner channel on the other side of the spoke and this region is filled by flow through the relatively low resistance to flow channel from the adjacent spoke. This results in an abutment of the glass fibers at the radially inner channel which abutment is circumferentially displaced from the alignment of the glass fibers in the vicinity of the gas vent which is normally positioned in proximity to the radially outer channel.

For purposes of convenience, the term "flow molded" shall mean a plastic molding technique, either injection molding or transfer molding, which relies upon plastic material flow to reach portions of the mold remote from the point of introduction of the plastic.

BRIEF DESCRIPTION OF THE DRAWING

FIG. 3 is an elevational plan view of the dynamoelectric machine housing fabricated in accordance with the teachings of the present invention and including the plastic flow lines resulting from the practice of the method of the present invention.

FIGS. 4 and 5 are sectional views taken along section lines 4—4 and 5—5, respectively, of FIG. 3 illustrating a portion of the method of the present invention.

DETAILED DESCRIPTION OF THE PREFERRED EMBODIMENT

Figure 1:
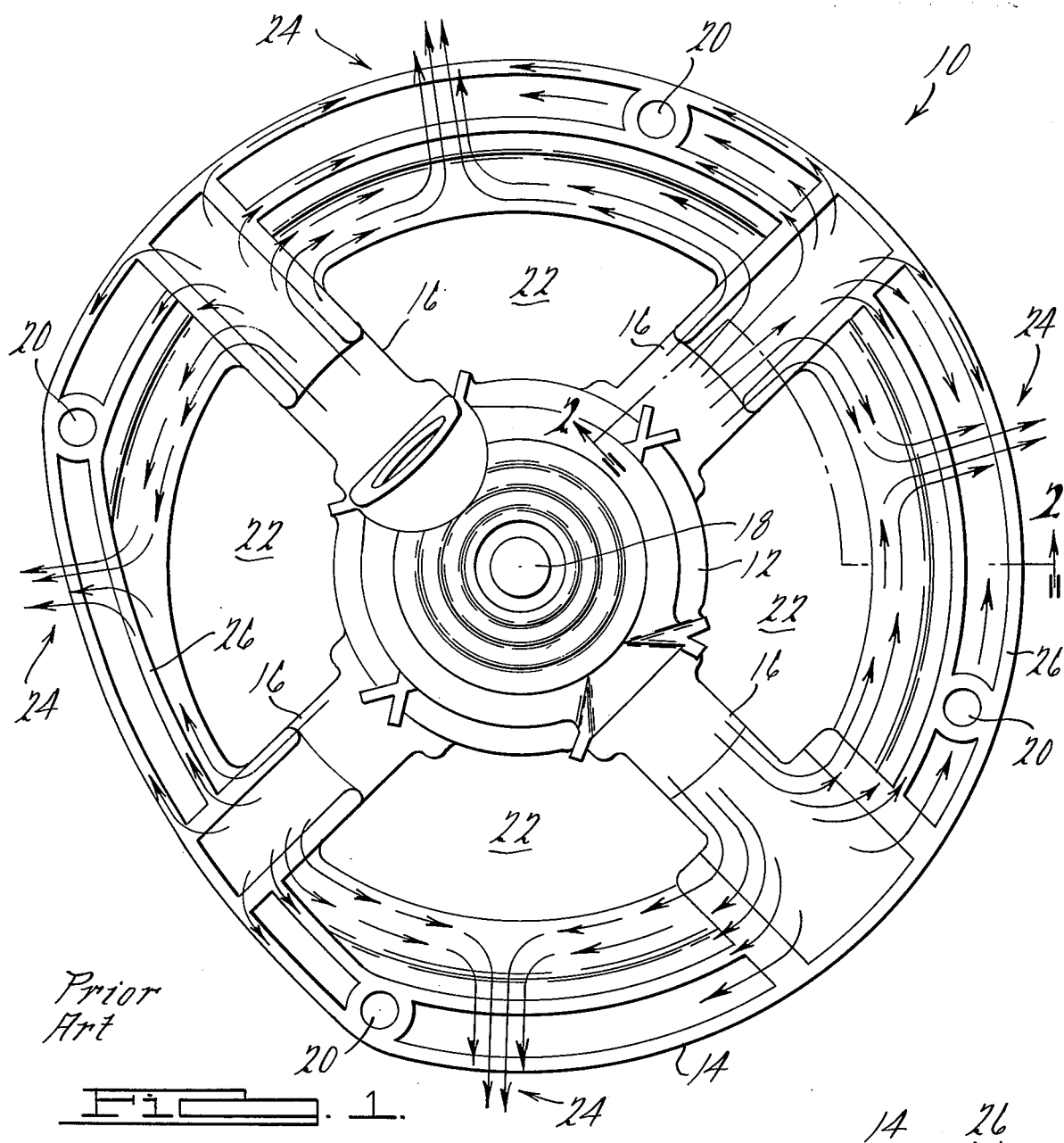
FIG. 1 illustrates an elevation plan view of a dynamoelectric machine housing, including plastic flow lines, which is illustrative of the problem which the present invention solves.
Figure 2:
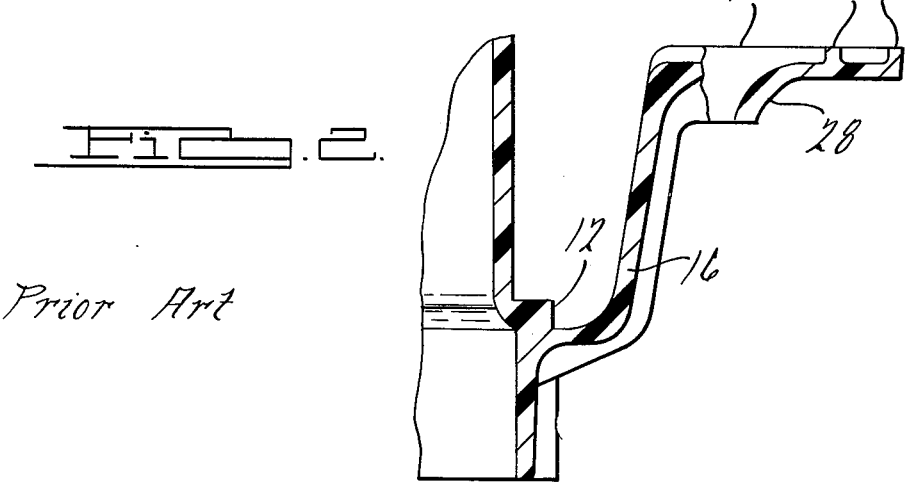
FIG. 2 is a cross sectional view taken along section line 2—2 of FIG. 1.

Referring now to FIGS. 1 and 2, a dynamoelectric machine housing generally designated as 10 is shown. This housing includes a generally cup-shaped central portion 12 and a generally annularly shaped mounting rim or flange 14. A plurality of spokes 16 interconnect the annular mounting rim or flange 14 with the hub 12. Hub 12 is arranged to receive a dynamoelectric machine armature for rotation about an axis which is generally perpendicular to the plane of this view and is designated as point 18. Central hub portion 12 further includes means for receiving a stator field producing structure about its external periphery. Annular rim portion 14 is provided with a plurality of mounting bolt locations 20 so that the dynamoelectric machine may be mounted to suitable duct structure to perform useful work. Central hub portion 12, annular rim portion 14, and spokes 16 cooperate to define a plurality of voids therebetween, denoted as 22, to provide for the passage of air therethrough in a direction generally parallel to axis 18. FIG. 1 includes a plurality of flow lines illustrative of the plastic flow pattern used in forming housing 10.

In forming the housing 10 of glass fiber filled plastic material, by the injection or transfer molding techniques, a suitable mold is formed having the requisite shapes and spacings and plastic material is introduced at the central portion thereof. In this instance, this corresponds with the region in the vicinity of axis 18. Plastic material may be so introduced in the form of a pellet having the requisite mass of plastic material to form the housing (transfer molding) or may be introduced in a flow of plastic material (injection molding) and in any event is formed under the influence of heat and pressure in the mold to form the desired shape. Plastic material must therefore flow from the central location defined generally by axis 18, through the central portion of the housing 12 and communicated to the annular rim 14 through each of the spokes 16. The plastic material flows from the spokes 16 clockwise and counterclockwise through the annular rim portion 14. Since the plastic material is flowed under the influence of heat and pressure, the mold of course must be substantially closed and the flow of plastic material is aided by the provision of gas vents as at 24 to permit the expulsion of gases from the mold. In order to assure that the part so formed is uniform and does not have any voids of plastic material, gas vents 24 must be generally equidistantly spaced, in terms of the plastic flow path length, from the point of introduction of the plastic material. Since the plastic housing 10 illustrated in FIG. 1 is generally symmetrical about axis 18, the gas vents are located approximately equidistantly spaced between the various spokes 16 at the outer periphery of the annular rim portion 14. The gas vents are noted as the flow path arrows 24 which are radially directed from the outer periphery of annular portion 14. As can be seen from this FIG. 1, plastic material flows radially outwardly through each of the spokes 16 and then circumferentially away from the spokes to fill the annular portion 14. The confluence of plastic material flow from adjacent spokes 16 results in an abutment and subsequent merging of the plastic flow which may then exit through the gas vents in the vicinity of the vent regions 24. This abutment and subsequent merging in radial flow results in alignment of the glass fibers.

FIG. 2 illustrates, in a sectional view taken along section line 2—2 of FIG. 1, portion of the annular mounting rim or flange 14 and one of the spokes 16 according to FIG. 1. Rim 14 includes a pair of outwardly projecting rib portions 26. Rib portions 26 provide for a degree of stiffening and rigidity for mounting flange 14 particularly as the molded plastic material forming housing 10 cools from its formation temperature. Mounting flange 14 is also provided with a downwardly curved segment 28 which, in cooperation with the upstanding rib members 26 balances any stress effects applied to the mounting rim or flange portion 14 during cooling and provides for a degree of circumferential stiffness between adjacent spokes 16. As can be seen from FIGS. 1 and 2, in order for plastic material to reach the gas vent regions 24, it must flow outwardly from the point of introduction 18, down through cup shaped portion 12, out and up through spokes 16 and around rim portion 14.

Referring now to FIGS. 3, 4 and 5, the method of the present invention is illustrated with respect to a motor housing 30 formed in accordance with the teachings of the present invention. Housing 30 can be seen to be merely an improved version of housing 10 and is otherwise usable as a substitute for the housing 10 in a dynamoelectric machine utilizing that housing. Housing 30 is provided with a central hub portion 32 which is substantially identical to central hub portion 12 of housing 10. Housing 30 is also provided with a substantially annular mounting rim or flange 34 which is connected to the central hub portion 32 by a web which is comprised of a plurality of spokes 36. Similarly, the axis of rotation of the armature which would be received by central hub portion 32 is identified as 38.

Annular mounting rim or flange portion 34 includes a plurality of passages 40 extending therethrough which are intended to receive mounting means in the form of screws or bolts. Annular mounting rim or flange 34 and central hub 32 are cooperative with the spokes 36 to define a plurality of air flow passages 42. The mold from which housing 30 is formed is also provided with a plurality of gas vents arranged to be located in proximity to the outer periphery of annular mounting rim or flange 34 generally in the regions denoted as 44. The annular rim or flange portion 34 as illustrated in FIGS. 3, 4 and 5 also includes means defining a plurality of stiffening ribs 46 arranged generally circumferentially and extending between adjacent spokes 36.

In order to avoid the occurrence of generally radially directed knit lines across rim portion 34 in the vicinity of the gas vents 44, the present invention contemplates the provision of means for directing plastic flow through the rim portion 34 from adjacent spokes 36 so as to cause an overlap of plastic flow resulting in a circumferential offset of any knit lines which would tend to be formed. In order to control plastic flow without disrupting the end configuration of the housing 30, the rim portion 34 is divided into inner and outer rim segments. The inner rim segments 34a are those portions of rim 34 which lie between adjacent spokes 36 and are positioned radially inwardly of the rib 46a. The outer rim segments 34b are those portions of rim 34 which lie between adjacent spokes 36 and between ribs 46a and 46b. For purposes of this discussion rib 46a may be considered to be a portion of the inner segments 34a while rib 46b may be considered to be a portion of the outer segments 34b.

Assuming that knit lines will occur in the vicinity of the gas vents 44 and whereever plastic flows from opposite directions abut, the inner rim segments 34a are provided with flow controlling means at either end thereof to assure that the knit lines which would occur in the inner segment primarily due to the abutting flow of plastic material coming together from opposite ends of the inner segments will occur at a point which is circumferentially displaced from the region of gas vents 44 by a maximum amount. In order to accomplish this result, the mold from which housing 30 is formed is provided with varying thicknesses in the rim forming portions thereof such that the thinner portions constitute flow resistances which impede the flow of plastic material into one end of a rim segment. Similarly, the outer rim segments 34b are also provided with flow controlling means at either end thereof to encourage a circumferential offset in the point of confluence of the plastic material flow from adjacent spokes 36. Additionally, the gas vents 44 are circumferentially displaced toward one spoke 36. Thus, a smaller volume of plastic material may enter a rim segment through an end having a flow impedance means. This requires that the greater volume of plastic material enter the rim segment from the opposite end resulting in a circumferential offset and displacement of the knit lines resulting from the abutment and from the confluence of the flows of plastic material.

With particular reference to FIG. 4, it can be seen that inner segment 34a of rim 34 is provided with a thickness which is approximately half that provided for the adjacent outer rim segment 34b. FIG. 4 shows a cross section of rim 34 on a side of a spoke 36 in the clockwise direction relative to FIG. 3. FIG. 5 shows a cross section of the rim portion 34 at a side of a spoke 36 in the counterclockwise direction relative to FIG. 3. As shown in FIG. 5, the inner segment 34a is here provided with a thickness which is substantially greater than that illustrated for the outer rim segment 34b. Furthermore, in order to encourage the plastic material to flow in a generally counterclockwise direction into the inner segment 34a from the adjacent spoke 36, the intersection of the rim portion 34a with the spoke 36 on the side of the rib 36 in the counterclockwise direction is provided with a relatively gradual radius of change denoted as curvature 48. To impede the flow of plastic in a clockwise direction from the spokes 36 into the inner rim segments 34a, the intersection of spoke 36 with inner segments 34a of rim portion 34 on the side of the spoke 36 in a clockwise direction relative to FIG. 3 is provided with a relatively sharp angulation, here illustrated as a right angular intersection such as at 50. Plastic flow into the outer rim segments 34b from the spokes 36 is controlled by the use of the different thicknesses established for the outer rim segments 34b. In order to encourage plastic material to flow clockwise, relative to FIG. 3, into the outer rim segments 34b, the outer rim segments 34b are provided with a relatively thickened cross sectional flow area in proximity to a spoke 36 and disposed clockwise therefrom. The outer rim segments 34b are provided with a relatively thin cross sectional flow area in proximity to a spoke 36 and disposed counterclockwise therefrom in order to impede plastic flow in the counterclockwise direction in the outer rim segments. Thus, FIG. 4 shows outer segment 34b to be thicker than the outer segment 34b illustrated in FIG. 5. The lineal speed or velocity of the plastic material, that is the speed or velocity of the plastic material in the filling direction will be higher where the material fills a rim segment through a relatively low impedance flow path where, as here, the rim segments are of approximately the same length and width and the depth has been varied to vary the flow impedance and the cross sectional flow area.

In the illustrated plastic housing 30, the arrangement of high and low impedance flow paths was selected to make use of mounting bolt holes 40 as impedances to flow. Having decided that the outer rim segments should have a low resistance to flow in the clockwise direction, the flow pattern for the inner rim segments naturally followed. By comparison of the gas vent locations 24 of FIG. 1 with the gas vent locations 44 of FIG. 3 it will be observed that the venting sites have been slightly rotated or offset clockwise (with respect to these figures) since actual flow paths now require differing flow times necessitated by the differing impedances to fluid flow. The resulting knit lines in the outer rim segments 34b, caused by alignment of the flow and of the fibers in order to exhaust through the gas vents 44, are produced generally in radial alignment with the gas vent regions 44. The knit lines in the inner rim segments 34a, caused by abutment of the flows of plastic material in the inner rim segments 34a are produced generally in the areas denoted as 52 in FIG. 3 and can be seen to occur in a region which is laterally or circumferentially displaced from the region of the gas vents 44.

By providing at least two generally circumferentially directed flow channels arranged to be filled from opposite directions at different fill or flow rates, the resulting knit lines do not produce a defect extending across the entirety of the rim portion 34. The use of differing flow channel cross sectional areas and differing radii of curvature at flow change of direction locations enables a remote rim to be formed by injection or transfer molding techniques in a single molding operation without the inclusion of preformed stiffening members to aid in forming the rim. Furthermore, the quantity of glass fiber filled plastic material used to form the housing is not significantly increased over that quantity of material used to form the housings under the unsatisfactory prior art techniques.

We claim:

1. The method of forming, in a mold, a flow molded plastic structure having a central body portion and a remote annular rim connected to a central body portion by at least one generally radially directed spoke member comprising the steps of:

introducing plastic material into the mold at a central location;

flowing the plastic material, under heat and pressure, through the central body portion and at least one spoke member;

causing the plastic material to flow from the at least one spoke member into the annular rim through a first pair of radially offset, circumferentially oppositely directed low impedance flow paths and a second pair of radially offset, circumferentially oppositely directed high impedance flow paths, each path of said first pair being radially adjacent a path of said second pair.

2. The method of claim 1 wherein the annular rim is connected to the central body portion by a plurality of spoke members and the step of causing the plastic material to flow into the rim includes the step of:

causing the plastic material to flow into the annular rim through each of the plurality of spoke members and each spoke member communicates with first and second pairs of annular rim flow paths of respectively low and high impedance.

3. The method of claim 2 wherein the first and second pairs of annular rim rlow paths which communicate with a spoke member are arranged to communicate at their opposite ends with second and first pairs of annular rim flow paths, respectively, which communicate with the adjacent spoke members.

4. The method of claim 1 wherein the step of causing the plastic material to flow is accomplished by providing the first pair of flow paths with a relatively large flow cross-section while providing the second pair of flow paths with a relatively small flow cross-section.

5. The method of claim 1 wherein the first pair of flow paths are also provided with relatively gradual changes in flow direction while the second pair of flow paths are provided with relatively abrupt changes in flow direction.

6. In a method for flow molding a unitary plastic structure having a remote annular rim connected to a central portion by at least one generally radially directed spoke member wherein a mold is formed having the general configuration of the plastic structure and plastic material is introduced into the mold at a central location and caused to flow, under heat and pressure, to fill the mold, the improvement comprising the steps of:

defining inner rim segments of the annular rim and outer rim segments of the annular rim, the inner and outer rim segments being fillable by plastic material flow from the at least one spoke member in clockwise and counterclockwise directions; and causing the plastic material to flow into an inner rim segment in one of said clockwise and counterclockwise directions and to flow into an outer rim segment in the other of said clockwise and counterclockwise directions with a relative high lineal speed; and causing the plastic material to flow into a second inner rim segment in the other direction and into an outer rim segment in the one direction at a relatively low lineal speed.

7. The improved method of claim 6 wherein the steps of causing the plastic material to flow into the inner and outer rim segments at different lineal speeds comprise the steps of:

providing a first relatively high impedance flow path in an inner rim segment in the other direction from the at least one spoke;

providing a second relatively high impedance flow path in an outer rim segment in the one direction from the at least one spoke;

providing a first relatively low impedance flow path in an inner rim segment in the one direction from the at least one spoke; and providing a second relatively low impedance flow path in an outer rim segment in the other direction from the at least one spoke.

8. The improved method of claim 7 wherein the steps of providing relatively low impedance flow paths comprise the steps of:

providing relatively large flow path cross sectional areas; and providing relatively gradual flow direction changes.

9. The improved method of claim 7 wherein the steps of providing relatively high impedance flow paths comprise the steps of:

providing relatively small flow path cross sectional areas; and providing relatively abrupt flow direction changes.

10. The improved method of claim 6 wherein the unitary plastic structure includes a plurality of spoke members and the steps of causing the plastic material to flow into the rim segments is performed for each spoke member.

* * * * *